United States Patent [19]
Hoy et al.

[11] Patent Number: 5,784,606
[45] Date of Patent: Jul. 21, 1998

[54] METHOD AND SYSTEM IN A SUPERSCALAR DATA PROCESSING SYSTEM FOR THE EFFICIENT HANDLING OF EXCEPTIONS

[75] Inventors: Thomas Alan Hoy; Terence Matthew Potter; Paul Charles Rossbach, all of Austin, Tex.

[73] Assignees: International Business Machines Corporation, Armonk, N.Y.; Motorola, Inc., Schaumburg, Ill.

[21] Appl. No.: 768,060

[22] Filed: Dec. 16, 1996

[51] Int. Cl.$^6$ ............................................. G06F 9/46
[52] U.S. Cl. .............................. 395/591; 395/800.23
[58] Field of Search ........................... 395/591, 800.23

[56] References Cited

U.S. PATENT DOCUMENTS

| | | | |
|---|---|---|---|
| 5,448,705 | 9/1995 | Nguyen et al. | 395/800.23 |
| 5,659,721 | 8/1997 | Shen et al. | 395/569 |

OTHER PUBLICATIONS

Walker et al., "Interrupt Processing in Concurrent Processors", Computer, IEEE, Jun. 1995, pp. 36–46.

Smith et al., "Implementing Precise Interrupts in Pipelined Processors", Transactions on Computers, IEEE, vol. 37, No. 5, May 1988, pp. 562–573.

Primary Examiner—William M. Treat
Attorney, Agent, or Firm—Lisa B. Yociss; Andrew J. Dillon

[57] ABSTRACT

A method and system in a data processing system are disclosed for efficiently handling exceptions. The data processing system includes a register for storing indications of multiple instructions while the multiple instructions are being concurrently processed. An exception is generated within the data processing system. A determination is made whether the exception was generated by one of the multiple instructions. In response to a determination that one of the multiple instructions generated the exception, a determination is then made whether an indication of the instruction which generated the exception is stored in a particular position within a register within the data processing system. In response to a determination that the indication of the instruction is stored in the particular position within the register, the exception is associated with a first priority group. In response to a determination that the indication of the instruction is not stored in the particular position within the register, the exception is associated with a second priority group. In response to a determination that the indication of the instruction did not generate the exception, the exception is associated with the second priority group.

18 Claims, 5 Drawing Sheets

| Priority Group/Level | Type | EXCEPTION | pre/post complete | |
|---|---|---|---|---|
| B/1 | Async | System Reset Hard Soft | post | 200 |
| B/2 | Async | Machine Check | post | 202 |
| A/3 | Precise | Data Storage Int (incls DABR) | pre | 204 |
| B/4 | Precise | Instr Storage Int | | 206 |
| B/5 | Async | External Int | post | 208 |
| A/2 | Precise | Alignment Int | pre | 210 |
| A/4 | Precise | Program Int | pre | 212 |
| A/1 | Precise | FPU Unavailable | pre | 214 |
| B/6 | Async | Decrementer | post | 216 |
| A/5 | Precise | System Call | post | 218 |
| A/8 | Precise | Trace-SE/BE [opt'l] not sc, rfi, tp | post | 220 |
| --- | Unimp | FP Assist | ---- | 222 |
| B/7 | Async | Perf Monitor | post | 224 |
| A/7 | Precise | Inst Addr Brkpt Reg | pre | 226 |
| B/3 | Async | Sys Management | post | 228 |
| A/6 | Precise | RFI | post | 230 |
| A/9 | | SO/isync/fpr_no_tgt | post | 232 |
| B/8 | | Nap/Softstop/Halt | post | 234 |

Fig. 4

METHOD AND SYSTEM IN A SUPERSCALAR DATA PROCESSING SYSTEM FOR THE EFFICIENT HANDLING OF EXCEPTIONS

BACKGROUND

1. Technical Field

The illustrative embodiment relates to superscalar data processing systems, and in particular to efficiently handling a plurality of exceptions generated within a superscalar data processing system. Still more particularly, the illustrative embodiment relates to associating an exception with a first priority group if the exception was generated by an instruction which is stored in a particular location of a register within a superscalar data processing system, and associating all other exceptions with a second priority group.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required.

Because multiple instructions are decoded and executed during a single clock cycle, exception conditions may be difficult to process. The multiple instructions may be in different stages of processing when the exception occurs. Therefore, responding to the exception may cause the superscalar data processing system to abort processing of the instructions at different stages, thus making it difficult ensure that proper processing continues once the exception is encountered.

The term "exception" as used herein includes both exceptions and interrupts. Exceptions are abnormal situations that may arise during execution that may cause a deviation from the normal execution sequence. Interrupts are suspensions of a process, such as execution of a computer program caused by an external event, and performed in such a way that the process can be resumed. Therefore, as used herein "exception" includes external and internal, synchronous, and asynchronous events. Precise exceptions are those where the instructions just prior to the exception have completed processing and the processing of instructions subsequent to the exception can be begun again.

Therefore a need exists for a method and system in a superscalar data processing system to efficiently handle a plurality of exceptions by associating a first of a plurality of exceptions with a first priority group and associating a second of the plurality of exceptions with a second priority group. For each priority group, the exceptions in each group are then associated with a priority level.

SUMMARY

It is therefore one object of the illustrative embodiment to provide an improved superscalar data processing system.

It is another object of the illustrative embodiment to provide a method and system for efficiently handling a plurality of exceptions generated within a superscalar data processing system.

It is yet another object of the illustrative embodiment to provide a method and system for associating an exception with a first priority group if the exception was generated by an instruction which is stored in a particular location of a register within a superscalar data processing system, and associating all other exceptions with a second priority group.

The foregoing objects are achieved as is now described. A method and system in a data processing system are disclosed for efficiently handling exceptions. The data processing system includes a register for storing indications of multiple instructions while the multiple instructions are being concurrently processed. An exception is generated within the data processing system. A determination is made whether the exception was generated by one of the multiple instructions. In response to a determination that one of the multiple instructions generated the exception, a determination is then made whether an indication of the instruction which generated the exception is stored in a particular position within a register within the data processing system. In response to a determination that the indication of the instruction is stored in the particular position within the register, the exception is associated with a first priority group. In response to a determination that the indication of the instruction is not stored in the particular position within the register, the exception is associated with a second priority group. In response to a determination that the indication of the instruction did not generate the exception, the exception is associated with the second priority group.

The above as well as additional objectives, features, and advantages of the illustrative embodiment will become apparent in the following detailed written description.

BRIEF DESCRIPTION OF THE DRAWINGS

The novel features are set forth in the appended claims. The illustrative embodiment itself, however, as well as a preferred mode of use, further objectives and advantages thereof, will best be understood by reference to the following detailed description of an illustrative embodiment when read in conjunction with the accompanying drawings, wherein:

FIG. 4 is a table including a plurality of exceptions and their associated priority groups and levels in accordance with the illustrative embodiment.

DETAILED DESCRIPTION OF ILLUSTRATIVE EMBODIMENT

An exemplary embodiment of the present invention and its advantages are better understood by referring to FIGS. 1–4 of the drawings, like numerals being used for like and corresponding parts of the accompanying drawings.

Figure 1:
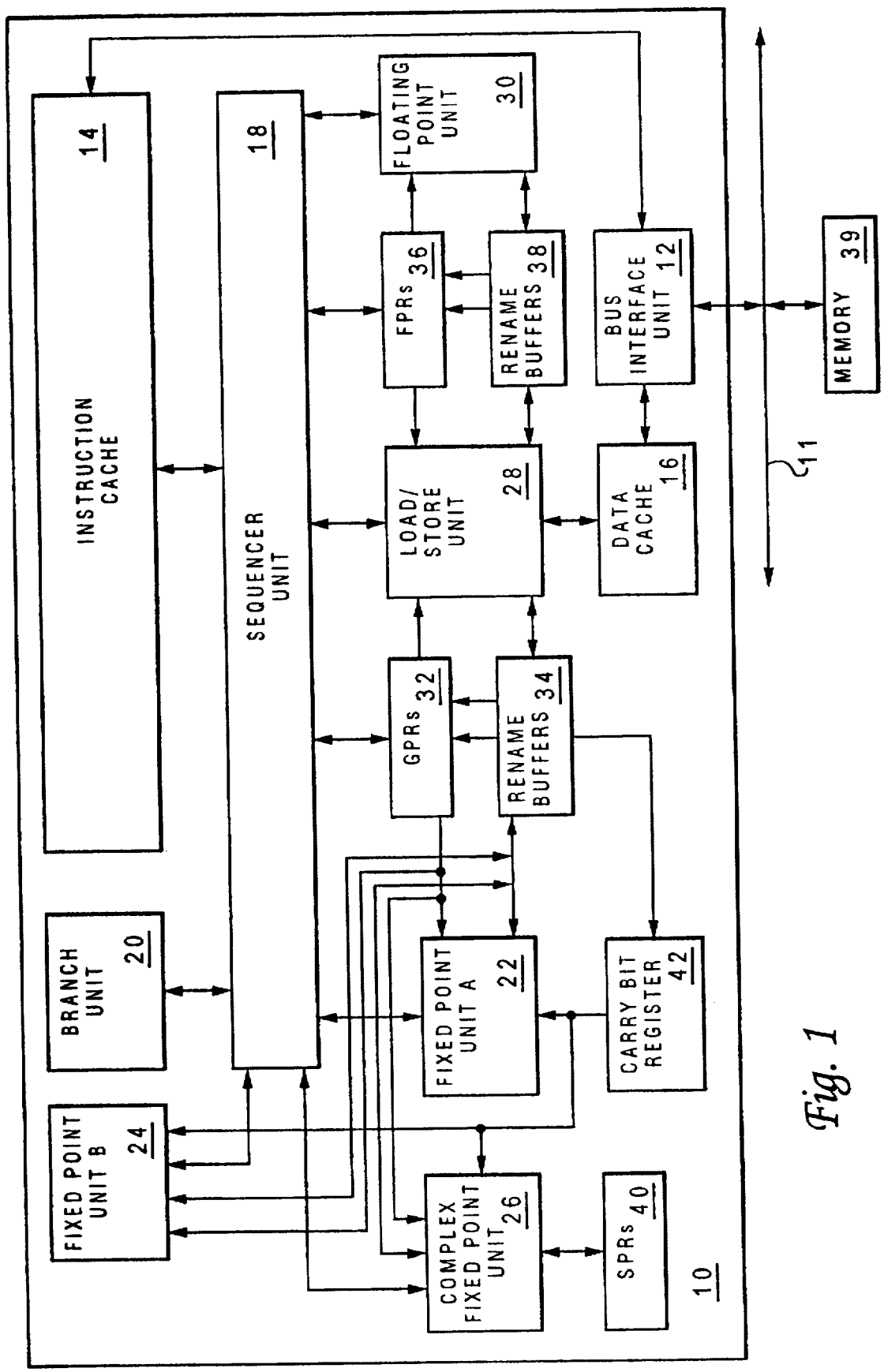
FIG. 1 depicts a high level block diagram of a superscalar data processing system 10 which may be utilized to implement the method and system of the illustrative embodiment.
Figure 2:
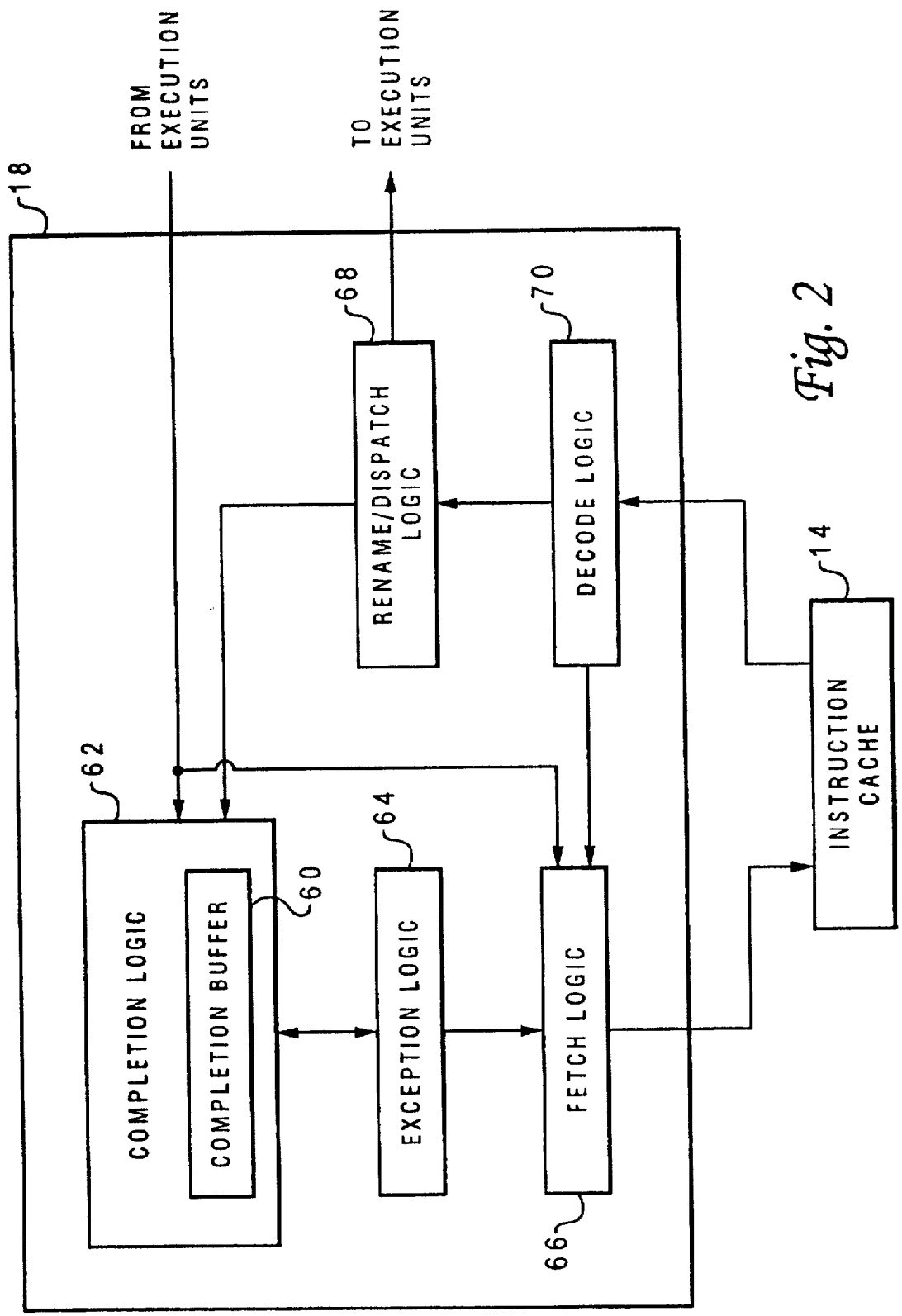
FIG. 2 illustrates a more detailed block diagram of the sequencer circuitry of the superscalar data processing system of FIG. 1 which may be used to implement the method and system of the illustrative embodiment.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28, and a floating point unit ("FPU") 30. FXUA 22, FXUB 24, CFXU 26, and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26, and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14 into Decode Logic 70 If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions, using Rename/Dispatch Logic 68, to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18, using Fetch Logic 66, selectively inputs (from instructions cache 14) one or more instructions from one or more memory addresses storing the sequence of instructions discussed further hereinabove in connection with branch unit 20, sequencer unit 18.

In the decode stage, sequencer unit 18, using Decode Logic 70, decodes up to four fetched instructions.

In the dispatch stage, sequencer unit 18, using Rename/Dispatch Logic 68, selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

A completion buffer 60 is provided within Completion Logic 62 to track the completion of the multiple scalar instructions which are being executed within the execution units. Completion Logic 62 also includes architected maps and a list of free rename buffers. Upon an indication that an instruction or a group of instructions have been completed successfully, in an application specified sequential order, completion buffer 60 may be utilized to initiate the transfer of the results of those completed instructions to the associated general purpose registers. In addition, in the event an exception condition occurs, completion buffer 60 may be utilized to initiate storage of the results of the execution of any instruction which completed prior to the exception and to control the instruction dispatcher to restart the process at the point where the exception condition occurred. In this manner, replacement is permitted of corrupted or invalid data to be replaced by a valid output in an efficient manner, or to initiate a new sequence of instructions as specified by the application specific program for specific types of exceptions.

A plurality of exceptions may be generated by Exception Logic 64 within data processing system 10. These exceptions may be generated by either instructions which are currently being processed, or by other sources, such as user by resetting the data processing system. The illustrative embodiment is a method and system for efficiently handling a plurality of exceptions by associating a first of a plurality of exceptions with a first priority group and associating a second of the plurality of exceptions with a second priority group. For each priority group, the exceptions in each group are then associated with a priority level. Each exception included within the first priority group is a higher priority than any of the exceptions included within the second priority group. Therefore, all first priority group exceptions will be processed prior to second priority group exceptions.

Each exception included within a priority group is also associated with a particular one of a plurality of priority levels. The exception within the first priority group which is associated with the highest pending priority level is processed prior to all other pending exceptions. The next pending exception associated with the highest pending priority level associated with the first priority group is then processed. This process continues until all pending exceptions associated with the first priority group are processed. Thereafter, any pending exceptions associated with the second priority group are processed. The exception within the second priority group which is associated with the highest pending priority level is processed prior to all other pending exceptions. The next pending exception associated with the highest pending priority level associated with the second priority group is processed. This process continues until all pending exceptions associated with the second priority group are processed. If, during processing of an exception associated with a first priority group an exception associated with a second priority group is generated, the exception associated with a first priority group is processed prior to the exception associated with the second priority group.

In order to determine which priority group an exception is to be associated with, a determination is made whether the exception was generated by an instruction whose indication is located at the bottom of the completion buffer. Exceptions generated by instructions whose indications are located at the bottom of the completion buffer are associated with the first priority group. Exceptions generated by instructions whose indications are not at the bottom of the completion buffer and exceptions which are generated other than by instructions are associated with the second priority group.

Figure 3A:
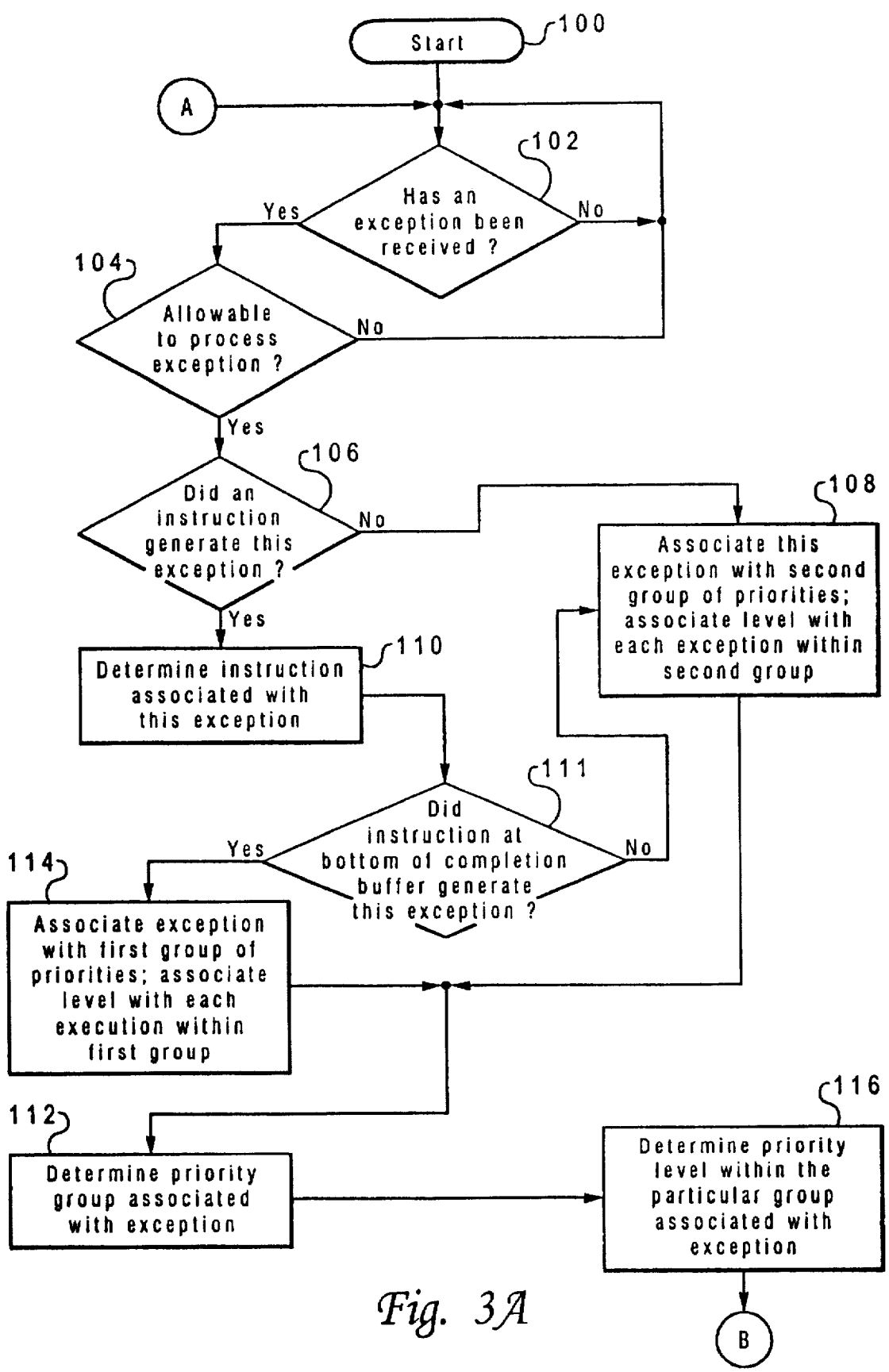
FIGS. 3A and 3B together are a high level flow chart depicting the efficient handling of a plurality of exceptions in accordance with the method and system of the illustrative embodiment.
Figure 3B:
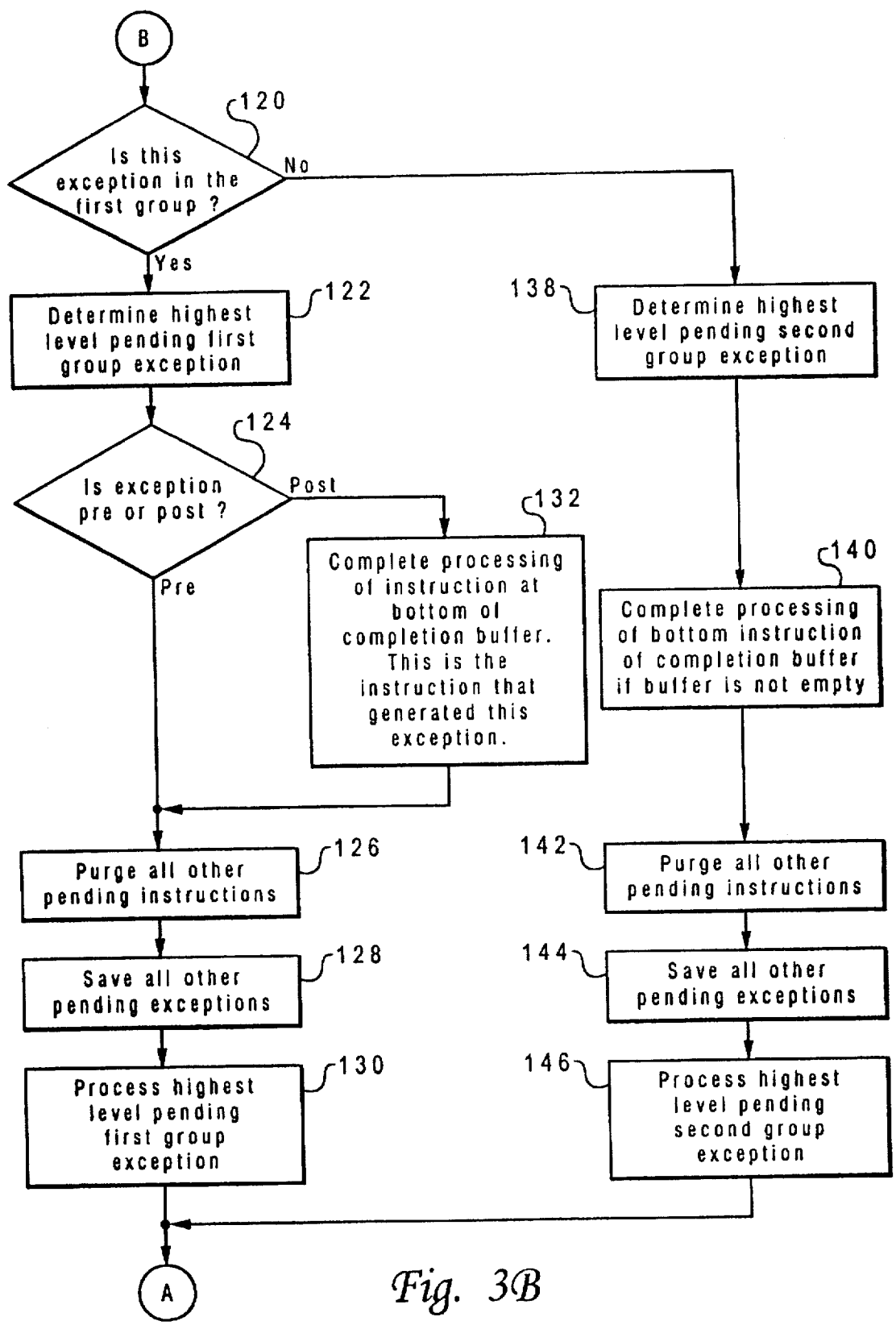

FIGS. 3A and 3B together are a high level flow chart depicting the efficient handling of a plurality of exceptions in accordance with the method and system of the illustrative embodiment. The process starts at block 100 and thereafter passes to block 102 which illustrates a determination of whether or not an exception has been received. If a determination is made that an exception has not been received, the process passes back to block 102. If a determination is made that an exception has been received, the process passes to block 104 which depicts a determination of whether or not processing the exception is allowed. If a determination is made that processing the exception is not allowed, the process passes back to block 102. Referring again to block 104, if a determination is made that processing the exception is allowed, the process passes to block 106 which illustrates a determination of whether an instruction generated this exception. If a determination is made that an instruction did not generate this exception, the process passes to block 108.

Referring again to block 106, if a determination is made that an instruction did generate this exception, the process passes to block 110 which depicts a determination of the instruction associated with this exception. Next, block 111 illustrates a determination of whether or not the instruction is located at a particular position within a register. As illustrated, the register is a completion buffer. The completion buffer is also sometimes called a reorder register. In a superscalar data processing system, the instructions are permitted to execute out of order, i.e. in an order which is different from the order the instructions are encountered in the programming code. The completion buffer is utilized to put the instructions back in their original order. Instructions are positioned in the buffer so that the next instruction in the original sequence is located at the bottom position of the buffer. Therefore, block 111 depicts a determination of whether or not an indication of the instruction is located at the bottom of the completion buffer.

If a determination is made that the indication of the instruction is not located at the bottom of the completion buffer, the process passes to block 108 which illustrates the association of this exception with the second priority group, and the association of this exception with a priority level within the second priority group. The process then passes to block 112.

Referring again to block 111, if a determination is made that the indication of the instruction is in the bottom position of the completion buffer, the process passes to block 114 which depicts the association of the exception with the first priority group, and the association of this exception with a priority level within the first priority group. The process then passes to block 112 which illustrates the determination of the priority group associated with this exception. Next, block 116 depicts the determination of the priority level within the priority group associated with this exception. Thereafter, the process passes to block 120 as depicted through connector B.

Block 120 illustrates a determination of whether or not this exception is associated with the first priority group. If a determination is made that this exception is associated with the first priority group, the process passes to block 122 which illustrates the determination of the highest level pending first group exception. Thereafter, block 124 illustrates a determination of whether the highest level pending first group exception is a type of exception is a pre-complete or a post-complete type of exception. When a pre-complete type of exception is generated, the instruction generating the exception does not complete processing until the exception has been processed. Once the exception has been processed, the processing of the instruction which generated the exception continues When a post-complete type of exception is generated, the instruction generating the exception completes processing before the exception is processed. Once the instruction has been processed, the exception is then processed and system processing is returned to the next sequential instruction.

Referring again to block 124, if a determination is made that this type of exception is a pre-complete type of exception, the process passes to block 126 which depicts purging all pending instructions. Next, block 128 illustrates the saving of all other pending exceptions. The process passes to block 130 which depicts the processing of the highest level pending first group exception. The process then passes as depicted to block 102 as illustrated through connector A.

Referring again to block 124, if a determination is made that the highest level pending exception is a post-complete type of exception, the process passes to block 132 which illustrates the completion of processing of the instruction whose indication is at the bottom of the completion buffer. This is the instruction which generated this exception. The process then passes to block 126.

Referring again to block 120, if a determination is made that this exception is not in the first group, the process passes to block 138 which depicts the determination of the highest level pending second group exception Next, block 140 depicts the completion of processing of the instruction whose indication is located at the bottom of the completion buffer if the buffer is not empty. Block 142 then illustrates the purging of all other pending instructions. Next, block 144 depicts the saving of all other pending exceptions. Thereafter, block 146 illustrates the processing of the highest level pending second group exception.

FIG. 4 is a table including a plurality of exceptions and their associated priority groups and levels in accordance with the illustrative embodiment. Exceptions 204, 210, 212, 214, 218, 220, 226, 230, and 232 are associated with a first priority group. Exceptions 200, 202, 206, 208, 216, 224, 228, and 234 are associated with a second priority group. Exception 200 is either a hard or soft system reset exception and is the highest possible exception within the second priority group. Exception 202 is a machine check exception and is the second highest possible exception within the second priority group. Exception 204 is a data storage interrupt exception and is the third highest possible exception within the first priority group. Exception 206 is an instruction storage interrupt exception and is the fourth highest possible exception within the second priority group. Exception 208 is an external interrupt exception and is the fifth highest possible exception within the second priority group.

Exception 210 is an alignment interrupt exception and is the second highest possible exception within the first priority group. Exception 212 is a program interrupt exception and is the fourth highest possible exception within the first priority group. Exception 214 is a floating point unit unavailable exception and is the first highest possible exception within the first priority group. Exception 216 is a decrementer exception and is the sixth highest possible exception within the second priority group. Exception 218 is a system call exception and is the fifth highest possible exception within the first priority group. Exception 220 is a trace exception and is the eighth highest possible exception within the first priority group. Exception 222 is a floating point software assist and is not implemented in the illustrative embodiment.

Exception 224 is a performance monitor exception and is the seventh highest possible interrupt in the second priority group. Exception 226 is an instruction address break point register exception and is the seventh highest possible interrupt in the first priority group. Exception 228 is a system management exception and is the third highest possible interrupt in the second priority group. Exception 230 is a return from interrupt instruction exception and is the sixth highest possible interrupt in the first priority group. Exception 232 is a group of implementation specific conditions that are handled in the illustrative embodiment implemented using the PowerPC architecture exceptions and are the ninth highest possible interrupt in the first priority group. Exception 234 is a power management exception and is the eighth highest possible interrupt in the second priority group.

Exceptions 200, 202, 208, 216, 218, 220, 224, 228, 230, and 234 are post-complete types of exceptions. Exceptions 204, 210, 212, 214, and 226 are pre-complete types of exceptions. Exceptions 204, 206, 210, 212, 214, 218, 220, 226, and 230 are precise exceptions. Exceptions 200, 202, 208, 216, 224, and 228 are asynchronous exceptions.

While the illustrative embodiment has been particularly shown and described, it will be understood by those skilled in the art that various changes in form and detail may be made therein without departing from the spirit and scope of the embodiment.

We claim:

1. A method in a data processing system for efficiently handling an exception, said data processing system including a register for storing indications of multiple instructions while said instructions are concurrently processed, said method comprising the steps of:

generating said exception within said data processing system;

determining whether said exception was generated in response to processing one of said instructions;

in response to a determination that said exception was generated in response to processing said one instruction, determining whether an indication of said one instruction is stored in a particular position within said register;

in response to a determination that said indication is stored in said particular position, associating said exception with a first priority group;

in response to a determination that said indication is not stored in said particular position, associating said exception with a second priority group; and in response to a determination that said exception was not generated in response to processing said one instruction, associating said exception with said second priority group.

2. The method according to claim 1, wherein said step of determining whether said indication is stored in a particular position within a register further includes the step of determining whether said indication is stored in a particular position within a completion buffer.

3. The method according to claim 2, wherein said step of determining whether said indication is stored in a particular position within a completion buffer further includes the step of determining whether said indication is stored in a bottom position within a completion buffer.

4. The method according to claim 1 further comprising the steps of:

generating a first and a second exception within a single clock cycle;

determining that said first exception is associated with said first priority group, so that said first exception was generated by a first of said multiple instructions;

determining that said second exception was not generated by one of said multiple instructions;

completing processing of said first of said multiple instructions; and processing said first exception prior to processing said second exception.

5. The method according to claim 1 further comprising the steps of:

generating a first and a second exception within a single clock cycle;

determining that said first exception is associated with said first priority group, so that said first exception was generated by a first of said multiple instructions;

determining that said second exception is associated with said first priority group, so that said second exception was generated by a second of said multiple instructions;

associating a first priority level with said first exception;

associating a second priority level with said second exception; and processing said first exception prior to processing said second exception, so that said first priority level is higher than said second priority level.

6. The method according to claim 1 further comprising the steps of:

generating a first and a second exception within a single clock cycle;

determining that said first exception is associated with said second priority group, so that said first exception was not generated by one of said multiple instructions;

determining that said second exception is associated with said second priority group, so that said second exception was not generated by one of said multiple instructions;

associating a first priority level with said first exception;

associating a second priority level with said second exception; and processing said first exception prior to processing said second exception, so that said first priority level is higher than said second priority level.

7. The method according to claim 1 further comprising the step of associating each exception associated with said first priority group with one of a plurality of types of exceptions.

8. The method according to claim 7 further comprising the steps of:

generating a first and a second exception within a single clock cycle;

determining that said first exception is associated with said first priority group, so that said first exception was generated by a first of said multiple instructions;

determining that said second exception is associated with said first priority group, so that said second exception was generated by a second of said multiple instructions;

associating a first priority level with said first exception;

associating a second priority level with said second exception;

processing said first exception prior to processing said second exception, so that said first priority level is higher than said second priority level.

9. The method according to claim 8 further comprising the steps of:

associating said first exception with a first of said plurality of types of exceptions;

associating said second exception with a second of said plurality of types of exceptions;

processing said first exception prior to completing processing of said first of said multiple instructions; and completing processing of said second of said multiple instructions prior to processing said second exception.

10. A data processing system for efficiently handling an exception, said data processing system including a register for storing indications of multiple instructions while said instructions are concurrently processed, comprising:

means for generating said exception within said data processing system; and means for:

determining whether said exception was generated in response to processing one of said instructions;

in response to a determination that said exception was generated in response to processing said one instruction, determining whether an indication of said one instruction is stored in a particular position within said register;

in response to a determination that said indication is stored in said particular position, associating said exception with a first priority group;

in response to a determination that said indication is not stored in said particular position, associating said exception with a second priority group; and in response to a determination that said exception was not generated in response to processing said one instruction, associating said exception with said second priority group.

11. The system according to claim 10, wherein said means for determining whether said indication is stored in a particular position within a register further includes means for determining whether said indication is stored in a particular position within a completion buffer.

12. The system according to claim 11, wherein said means for determining whether said indication is stored in a particular position within a completion buffer further includes means for determining whether said indication is stored in a bottom position within a completion buffer.

13. The system according to claim 10 further comprising:

means for generating a first and a second exception within a single clock cycle; and means for:

determining that said first exception is associated with said first priority group, so that said first exception was generated by a first of said multiple instructions;

determining that said second exception was not generated by one of said multiple instructions;

completing processing of said first of said multiple instructions; and processing said first exception prior to processing said second exception.

14. The system according to claim 10 further comprising:
means for generating a first and a second exception within a single clock cycle; and
means for:
- determining that said first exception is associated with said first priority group, so that said first exception was generated by a first of said multiple instructions;
- determining that said second exception is associated with said first priority group, so that said second exception was generated by a second of said multiple instructions;
- associating a first priority level with said first exception;
- associating a second priority level with said second exception; and
- processing said first exception prior to processing said second exception, so that said first priority level is higher than said second priority level.

15. The system according to claim 10 further comprising:
means for generating a first and a second exception within a single clock cycle; and
means for:
- determining that said first exception is associated with said second priority group, so that said first exception was not generated by one of said multiple instructions;
- determining that said second exception is associated with said second priority group, so that said second exception was not generated by one of said multiple instructions;
- associating a first priority level with said first exception;
- associating a second priority level with said second exception; and
- processing said first exception prior to processing said second exception, so that said first priority level is higher than said second priority level.

16. The system according to claim 10 further comprising means for associating each exception associated with said first priority group with one of a plurality of types of exceptions.

17. The system according to claim 16 further comprising:
means for generating a first and a second exception within a single clock cycle; and
means for:
- determining that said first exception is associated with said first priority group, so that said first exception was generated by a first of said multiple instructions;
- determining that said second exception is associated with said first priority group, so that said second exception was generated by a second of said multiple instructions;
- associating a first priority level with said first exception;
- associating a second priority level with said second exception;
- processing said first exception prior to processing said second exception, so that said first priority level is higher than said second priority level.

18. The system according to claim 17 further comprising means for:
- associating said first exception with a first of said plurality of types of exceptions;
- associating said second exception with a second of said plurality of types of exceptions;
- processing said first exception prior to completing processing of said first of said multiple instructions; and
- completing processing of said second of said multiple instructions prior to processing said second exception.

* * * * *